(No Model.) 3 Sheets—Sheet 1.

J. PALMER.
ATTACHMENT FOR CULTIVATORS AND PLANTERS.

No. 278,452. Patented May 29, 1883.

Witnesses:—

Inventor:—

(No Model.)  3 Sheets—Sheet 2.
J. PALMER.
ATTACHMENT FOR CULTIVATORS AND PLANTERS.
No. 278,452.  Patented May 29, 1883.
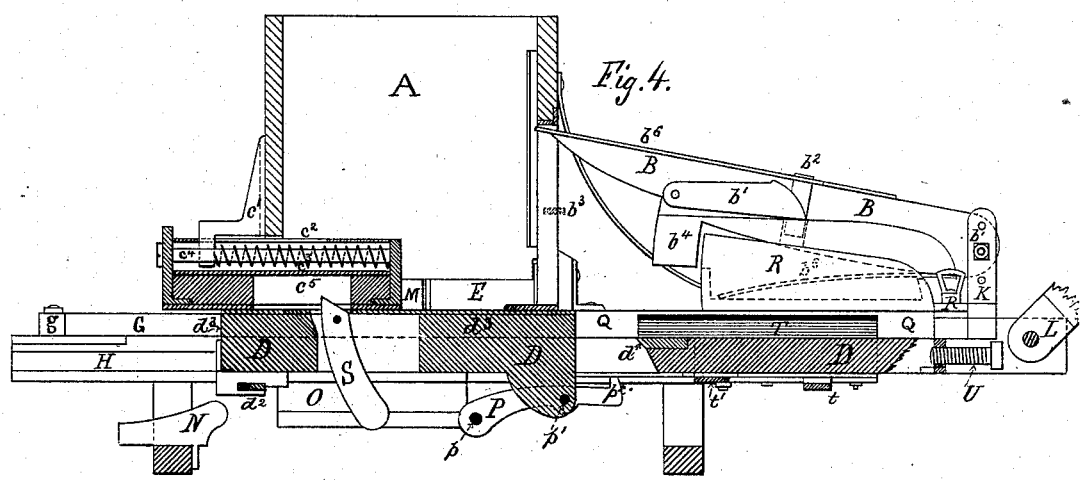
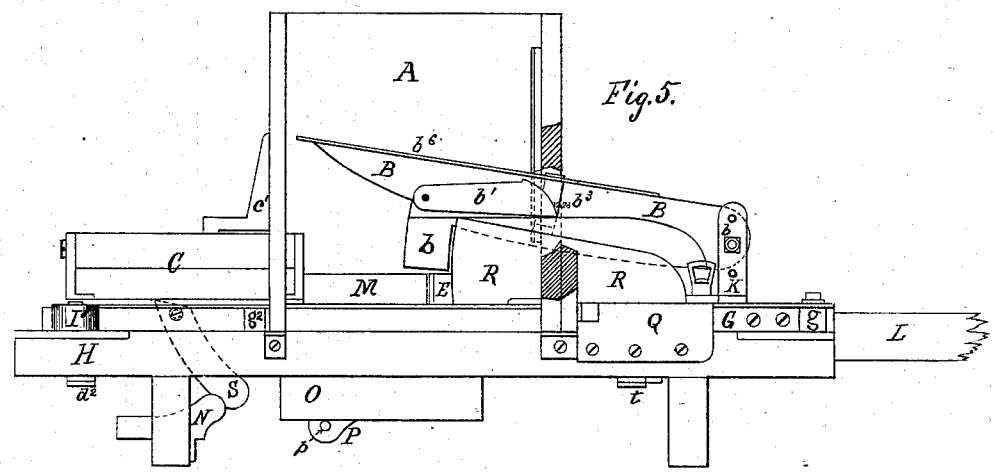
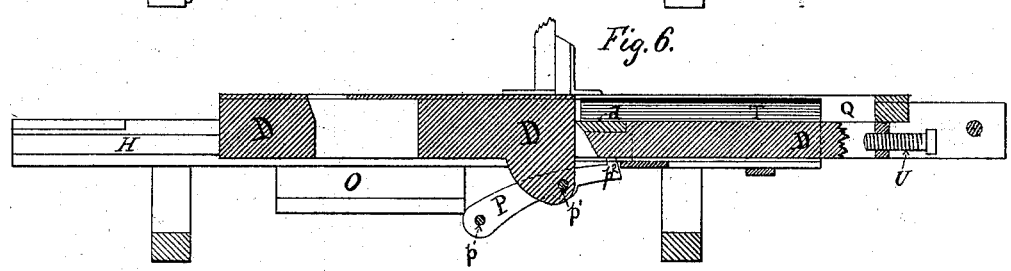
Witnesses:-  Inventor:-

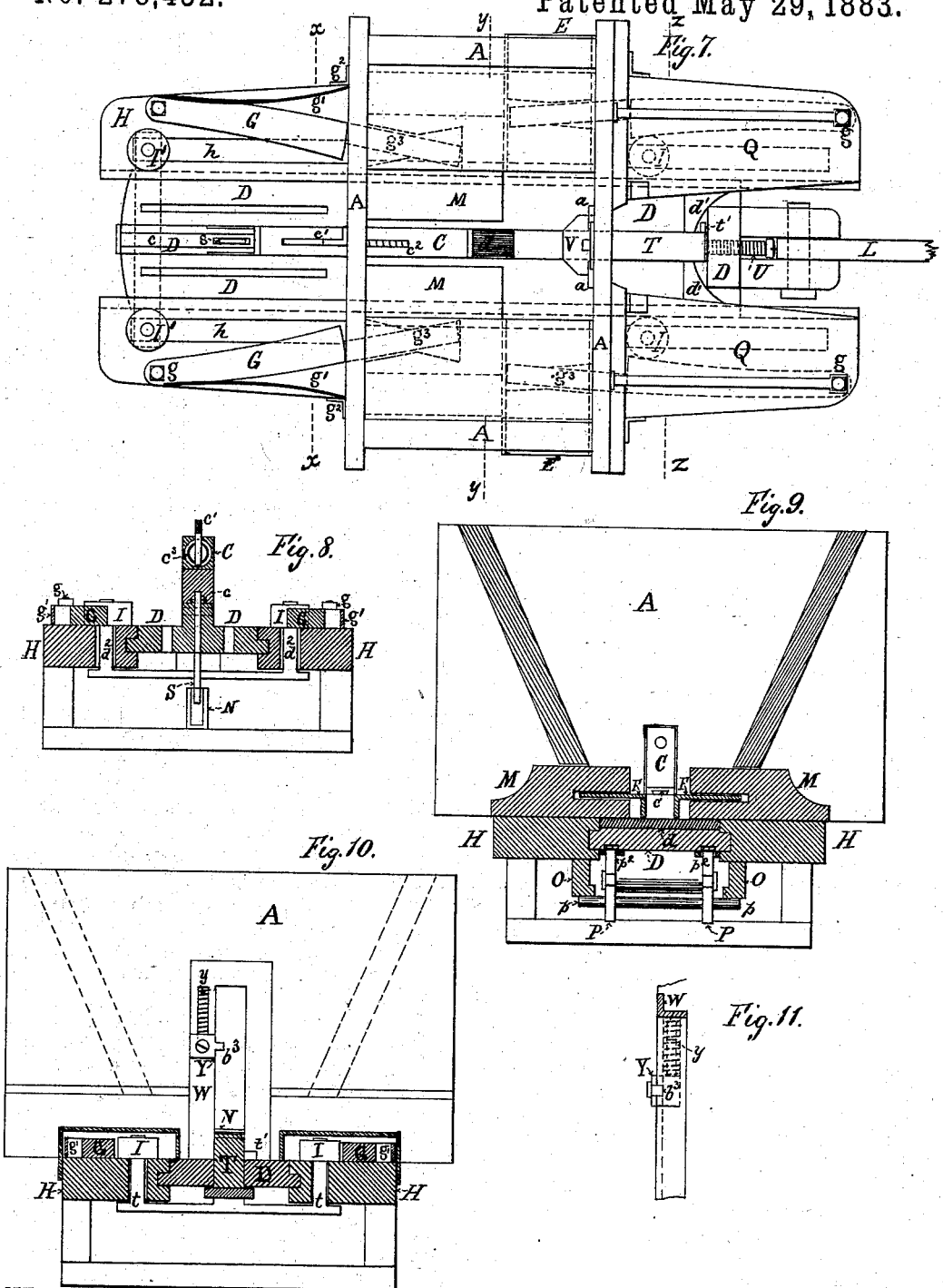

UNITED STATES PATENT OFFICE.

JEREMIAH PALMER, OF BROOKLYN, NEW YORK.

ATTACHMENT FOR CULTIVATORS AND PLANTERS.

SPECIFICATION forming part of Letters Patent No. 278,452, dated May 29, 1883.

Application filed October 16, 1880. (No model.)

*To all whom it may concern:*

Be it known that I, JEREMIAH PALMER, a citizen of the United States, residing in the city of Brooklyn, in the county of Kings and State of New York, have invented a new and useful Improvement or Attachment for Cultivators and Planters; and I do hereby declare that the following, taken in connection with the accompanying drawings, is a full, clear, and accurate description of the same.

The object of my improvement is to produce a hopper or attachment for cultivators and planters, which may be attached to any cultivator or planter, and which is especially designed and adapted for planting cotton or other seed which is enveloped in a fibrous or sticky substance or cover, but which may also be applied and used for planting corn or other grain, and planting purposes generally.

My improvement consists in mechanism producing a number of movements, the design of which is to keep the cotton-seed or other seed agitated and force it to a chamber in the center of the hopper, where it is compressed, and thence forced out of a drop, throat, or opening, and so falls to the ground.

The most important advantage which I claim for my improvement is that it prevents any clogging or choking of the hopper by the seed.

Figure 1:
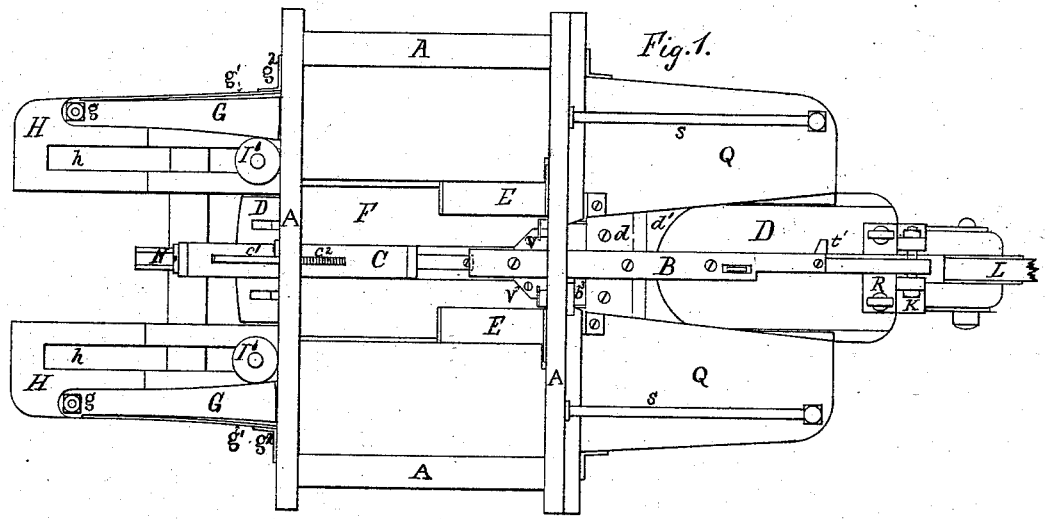
Figure 2:
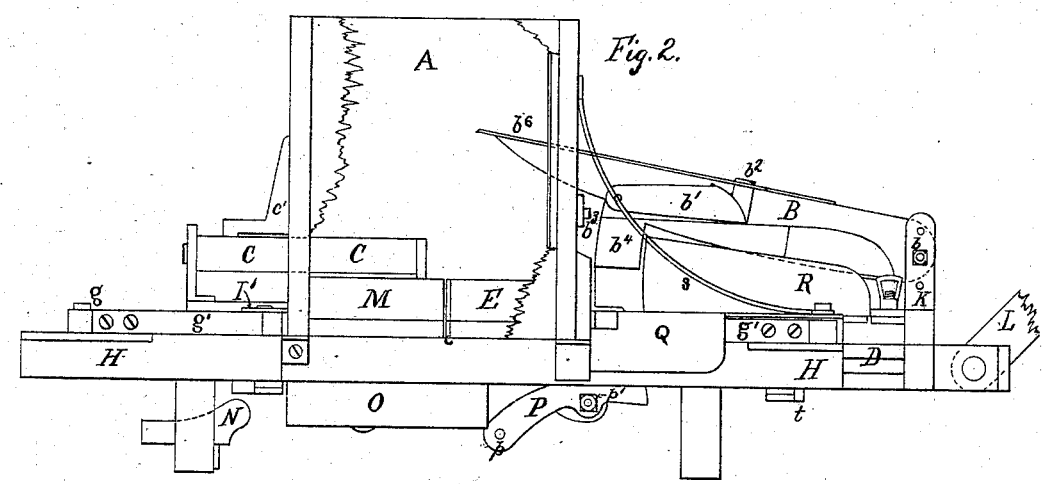
Figure 3:
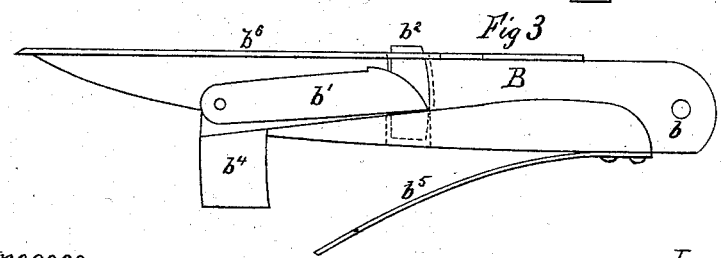

In the drawings, Figure 1 represents a plan view of my improvement; Fig. 2, a side elevation of my improvement, with side of hopper broken away; Fig. 3, a detail of the compressor; Fig. 4, a vertical central section through my improvement, showing the drop or throat open. Fig. 5, a side elevation of my improvement, with side and a portion of the front of hopper broken away; Fig. 6, a detail of Fig. 4, showing the drop or throat shut; Fig. 7, a plan view of my improvement prepared for corn; Fig. 8, a section on line $x\,x$ of Fig. 7; Fig. 9, a section on line $y\,y$ of Fig. 7; Fig. 10, a section on line $z\,z$ of Fig. 7, showing adjustable nipple; Fig. 11, a detail of adjustable nipple.

In my improvement, A represents the hopper. Below the hopper, at its front and rear, is the carrier D, made in two sections. These sections of the said carrier D are provided with tongues or flanges at their sides, and slide forward and backward in corresponding recesses in the frame H, secured to and below the hopper A, on each side of the sections of carrier D.

Secured to the rear section of carrier D is the cross-bar $d^2$, to the ends of which are attached pins $t$, which project vertically upward from said cross-bar $d^2$, and upon which pins the friction-rollers I' revolve. (See Figs. 1, 7, and 8.) The journals of the said friction-rollers I' move forward and backward in the slots $h$ in frame H, with the forward and backward movement of the rear section of carrier D, and are caused to revolve on their pins by pressing against their bars G, one end of which is secured by the bolts $g$ to the frame H, and the other end of which is secured by arms $g^3$ to the side plungers M. These bars G bear against the arms or projections $g^2$, secured to the hopper A.

Secured to the front section of carrier D, and moving forward and backward in a slot in said front section, is the adjustable feed-bar T, which works in the said slot between the guides $d'\,d'$, and is also provided with the arm or guide $t'$. The feed-bar D is adjusted by means of the screw U, (see Fig. 7,) thus regulating the size of the opening or throat between the front and rear sections of carrier D. Secured to this adjustable feed-bar T is the cross-bar $t$, at the ends of which are pins, on which pins are the friction-rollers I, moving forward and backward in slots corresponding to slots $h$, in which the friction-rollers I' move. These friction-rollers I' move backward and forward with the adjustable feed-bar T, to which they are attached by cross-bar $t$, and are caused to revolve by pressing against the spring-bars G, which are secured at one end, by bolts $g$, (see Fig. 7,) to frame H, and on their other ends carry arms $g^3$, which are attached to the side plungers E. The said spring-bars G are controlled by springs similar to the springs $g'$, and in the same manner as the spring-bars G, attached to frame H at rear of hopper A. These springs, similar to said springs $g'$, either bear against arms projecting from side of hopper A, similar to the arms $g^2$, or against the sides of the covers Q, which may be used to cover the frame H, between which the front and rear sections of carrier D run.

Secured at one end to the side of hopper A, and having their other ends secured by the bolts $g$ to the covers Q, are the arms $s$, used for the purpose of strengthening the structure. (See Fig. 1.)

F F are slot-plates attached to hopper A, on which the side plungers, M and E, having corresponding slots, move in and out from the hopper A.

Secured to the front section of carrier D is a knife or sharp edge, $d$, for the purpose of cutting any cotton or other seed or obstruction that may be lodged between the front and rear sections of carrier D.

The posts K, secured on the front section of carrier D, and projecting vertically above it, are provided with holes $b$ at different heights, through which holes $b$ passes a bolt, on which the compressor B, running in the vertical guides R, has its bearing. The compressor B works in combination with the nipple or trip $b^3$, which forms a part of the arm Y, attached to plate W, which is secured to the hopper A and around the sides of an opening in the front of hopper A, into which opening the nipple $b^3$ projects, and through which opening the compressor B runs. The plate W may be provided with the spring $y$, attached to arms V and rendering the nipple $b^3$ automatically adjustable. (See Figs. 10 and 11.) In this compressor B, (see Fig. 3,) $b'$ is a gravity-switch or guide-bar, below which the nipple $b^3$ passes in the backward motion of the compressor B as it moves backward with the front section of carrier D, and in the forward return motion of said section of carrier D said nipple $b^3$ passes above and on the top of said gravity-switch $b'$, thus pressing down the compressor B.

$b^6$ is a plate projecting from the top of the compressor B for the purpose of forcing down the cotton-seed in hopper A.

$b^2$ is a vertical bar attached near one end of the gravity-switch $b'$, and sliding vertically in the plate $b^6$ to retain said gravity-switch $b'$ in place.

$b^4$ is a block secured to and forming the compressing part of compressor B.

$b^5$ is a spring secured beneath the compressor B, which elevates said compressor B after the nipple $b^3$ has passed over and been disengaged from the top of the gravity-switch $b'$.

Secured to the front section of carrier D is the pitman L, by which motion is communicated to my improvement from the cultivator and planter to which it is attached.

Secured to the bottom of the rear section of carrier D by the cross-bar $p'$, and having their bearing on the same, are the coupling-hooks P, through one end of which passes the cross-bar $p$ and the other end of which is formed into the hooks $p^2$, which engage in slots formed on the under side of the front section of carrier D. These coupling-hooks P have their ends through which the cross-bar $p$ passes of much greater weight than their other ends, on which are the hooks $p^2$, thus causing said coupling-hooks P to operate in part by their own gravity.

O represents slides or runners which are attached to the frame, beneath the hopper A, and on which slides or runners the cross-bar $p$, which connects the weighted ends of the coupling-hooks P, and extends beyond them, slides or runs.

Secured to the rear section of carrier D is the follower $d^3$, above which is attached the lightning plunger C. In this plunger C, $c$ is the slot in which the plunger C moves. $c'$ is the plate or check attached to hopper A, which serves to compress the spring $c^3$ in the backward motion of the plunger C. $c^4$ is the spindle surrounded by the spring $c^3$. $c^2$ is a slot, in which the spindle surrounding spring $c^3$ and said spring work. $c^5$ is the slot in which the top of the trigger S works or moves.

N is the knob or plate which actuates or engages the said trigger S.

V is a plate or cut-off placed beneath the opening in the front of hopper A, under which the adjustable feed-bar T passes in the backward motion of carrier D, and under which, in the forward motion of the carrier D, the follower $d^3$, on which is the plunger C, forces the seed into the throat or opening between the two sections, and so to the ground.

The operation of my improvement is as follows: The hopper A being filled with cotton-seed, the machine to which my improvement is attached is put in motion, and by the pitman L motion is communicated to the connected parts and imparts a backward motion to the front section of carrier D, which carries with it the adjustable feed-bar T, moving in a slot in said carrier D, and the cross-bar $t$, which is attached to said feed-bar T. This backward motion of said carrier D also carries back the compressor B and vertical guides R, in which said compressor B runs, and causes it to pass in and under the opening in the front of hopper A, into which opening the nipple $b^3$ projects, and also causes the said nipple $b^3$ to pass below the gravity-switch $b'$. The cross-bar $t$, secured to the adjustable feed-bar T, also carries back the friction-rollers I, which move backward in slots in frame H, corresponding to the slots $h$ on the rear portion of frame H, and these friction-rollers I, pressing against the spring-bars G, revolve on their pins, which project vertically from cross-bar $t$, and cause the spring-bars G to press against their springs, corresponding to springs $g'$, and thus cause the side plungers E, connected by arms $g^3$ to spring-bars G, to move outward from the hopper A on the slot-plates F. This backward movement of the front section of carrier D brings said front section in contact with the rear section of carrier D, and closes the door or opening through which the seed falls in planting, the knife $d$ cutting any stray cotton-seed or other obstruction which may be caught between the two sections of carrier D, and causing it to drop out of the way. By this contact of the front section with the rear section of carrier D motion is imparted to the said rear section, which causes the weighted end of the coupling-hooks P, attached by cross-bar $p'$ to the rear section of carrier D, to fall, and thus raises the hooked ends $p^2$ of said coupling-hooks P, and causes said hooks $p^2$ to engage with the slots formed for this purpose in the bottom of the front section of carrier D. The two sections of carrier D are thus firmly secured together by the coupling-hooks P, and move backward, the cross-bar $p$ of the coupling-hooks P sliding backward on the runners O, attached to the frame, below the hopper A. This backward motion causes the adjustable feed-bar T to move back under the plate or cut-off V, and imparts a backward movement to the follower $d^3$, secured to the rear section of carrier D, and which follower $d^3$ has the lightning plunger C secured above it. The follower $d^3$, receding from the adjustable feed-bar T, forms a chamber in the bottom of the hopper A. The backward motion of the lightning plunger C causes the end of the arm or piece $c'$, attached to hopper A, to engage with spring $c^2$ and compress the said spring $c^2$. The backward motion of carrier D carries with it the cross-bar $d^2$, attached to its rear section, and thus causes the friction-rollers I', attached by their pins to said cross-bar $d^2$, to move back in the slots $h$. These friction-rollers, in their backward motion, press against the spring-bars G, which cause the said friction-rollers I' to revolve on their pins. This backward movement of the friction-rollers I' releases the springs $g'$, bearing against the spring-bars G, which causes the side plungers M, attached by arms $g^3$ to said spring-bars G, to move inward on the slot-plate F. The backward movement of the two sections of carrier D continues until the cross-bar $d^2$, attached to the rear section of carrier D, strikes against the ends of the frame H, when the backward movement ceases, the action is reversed, and the forward movement begins. In this forward movement the pressure of the friction-rollers I', revolving on their pins and moving forward in slots $h$ against the spring-bars G, causes them to press in turn against the springs $g'$, thus causing the side plungers M, connected by the arms $g^3$ to the spring-bars G, to move out on the slot-plates F from the hopper, instead of in, and the twigger S of the lightning plunger C, moving in the slot $c^4$, is disengaged by contact with the knob N, and causes the spring $c^2$, which has been compressed by the arm $c'$, to be released, and thus imparts a quick forward motion to said plunger C, which agitates the seed in the hopper, and forces a portion of the seed before said plunger C and the follower $d^3$ into the chamber or opening formed in the hopper A between the said follower $d^3$ and adjustable feed-bar T. At the same time, by the forward motion of the carrier D, the cross-bar $p$ of the coupling-hooks P is caused to reverse its motion and move forward on the runners O, and, sliding from the ends of the runners O, causes the hooks $p^2$ to disengage themselves from the slots in the front section of carrier D, and thus uncouple the said two sections, and the separation of the two sections and their movement from each other forms the throat or opening through which the seed falls. The reverse motion of carrier D carries forward into the front section of said carrier the adjustable feed-bar T, and also causes the friction-rollers I, attached by their pins to cross-bar $t$, which is secured to feed-bar T, to move forward in their slots in frame H and revolve on their pins, and thus release the springs $g'$, which bear against the spring-bars G, and thus reverse the action of the side plungers E, secured by arms $g^3$ to the spring-bars G, and cause said side plungers E to move inward, instead of outward, on the slot-plates F. These alternate inward and outward motions of the side plungers, E and M, force the seed into the center of the hopper and toward the opening or chamber formed between the follower $d^3$ and adjustable feed-bar T in the bottom of the hopper, ready to be compressed by the compressor B. The forward motion of the front section of carrier D also causes the nipple $b^3$ to engage and pass over the top of the gravity-switch $b'$ of the compressor B, and press down the said gravity-switch $b'$. This gravity-switch $b'$ in turn presses down on the compressor B and the spring $b^5$, and causes the block $b^4$ on the end of the compressor B to compress the seed in the chamber or opening formed in the bottom of the hopper A between the follower $d^3$ and the adjustable feed-bar T, the plate $b^6$ at the same time pressing the seed beneath it toward the bottom of the hopper. By the forward motion of the follower $d^3$, attached to rear section of carrier D, a portion of the seed which has been compressed by the block $b^4$ on the compressor B in the chamber or opening in the bottom of the hopper, between the follower $d^3$ and feed-bar T, is forced forward under the plate V, and, arriving at the front edge of the hopper, is dropped through the throat or opening between the front and rear sections of carrier D to the ground. When the forward motion is complete the nipple $b^3$ has passed over the top of the gravity-switch $b'$ of compressor B and become disengaged from the same, thus releasing the spring $b^5$, which elevates the compressor B and fits it to resume operation.

Before operating my improvement the size of the chamber or opening in the bottom of hopper A, formed between the follower $d^3$ and adjustable feed-bar T, is regulated to a size sufficient to hold the amount of seed it is desired to plant in one place by turning the screw U, which, bearing against one end of the adjustable feed-bar T, adjusts the distance of the other end of said feed-bar T from the end of follower $d^3$.

In planting corn or other cereals the compressor B and vertical guides R may be removed from the front section of carrier D and a slide placed in the interior of hopper A and run in grooves $a\ a$, as shown in Fig. 7, and pressed down in said grooves, so as to rest on the plate V, and thus close the opening in the plate W at the front of hopper A, through which the compressor B passes.

The side plungers, M and E, may be pinned back by pins passed through holes in said plungers, thus keeping them from moving in and out.

The lightning plunger C may also be dispensed with, if desired, as its action is simply to facilitate the agitation of seed in the hopper and the forcing of it forward to such a position that it can be acted on by the compressor.

Having thus described my invention, what I claim, and desire to secure by Letters Patent, is—

1. The carrier D, in two sections, the front section of which is provided with the adjustable feed-bar T, and the rear section of which is provided with the follower $d^3$ and the coupling-hooks P.

2. The carrier D, in two sections, the front section of which is provided with the adjustable feed-bar T, compressor B, and vertical guides R, and the rear section of which is provided with the follower $d^3$ and coupling-hooks P.

3. The carrier D, in two sections, the front section of which is provided with the adjustable feed-bar T, compressor B, and vertical guides R, and the rear section of which is provided with the follower $d^3$, plunger C, and coupling-hooks P.

4. The carrier D, in two sections, the front section of which is provided with the adjustable feed-bar T and compressor B, and the rear section of which is provided with the follower $d^3$, plunger C, and coupling-hooks P.

5. The compressor B, provided with the gravity-switch $b'$, the vertical guide $b^2$, the compressing-block $b^4$, the spring $b^5$, and plate $b^6$.

6. The combination of the compressor B, provided with the gravity-switch $b'$, the vertical guide $b^2$, the compressing-block $b^4$, the spring $b^5$, and plate $b^6$, with the nipple or trip $b^3$.

7. The combination of the compressor B, provided with the gravity-switch $b'$, the vertical guide $b^2$, the compressing-block $b^4$, the spring $b^5$, and plate $b^6$, with the adjustable nipple or trip $b^3$, provided with the spring $y$, and attached to the plate W.

8. The plunger C, provided with the spindle $c^4$, spring $c^3$, slots $c^2$ and $c^5$, and trigger S.

9. The combination of the plunger C, provided with the spindle $c^4$, spring $c^3$, slots $c^2$ and $c^5$, and trigger S, with the arm $c'$ and knob N.

10. The combination of the coupling-hooks P, provided with the cross-bars $p$ and $p'$ and hooks $p^2$, with the rear section of carrier D.

11. The combination of the coupling-hooks P, provided with the cross-bars $p$ and $p'$ and hooks $p^2$, with the front and rear sections of carrier D.

12. The combination of adjustable feed-bar T, screw U, follower $d^3$, and front and rear sections of carrier D.

13. The combination of front and rear sections of carrier D, adjustable feed-bar T, screw U, follower $d^3$, and plate or cut-off V.

14. The combination of the rear section of carrier D, provided with the coupling-hooks P, with the runners O.

15. The combination of the rear section of carrier D, provided with coupling-hooks P, with runners O, and front section of carrier D.

16. The combination of the front section of carrier D, provided with the adjustable feed-bar T and the compressor B, with the rear section of carrier D, provided with the plunger C, follower $d^3$, and coupling-hooks P, with the side plungers, M and E, and their attachments.

17. The combination of the front section of carrier D, provided with the adjustable feed-bar T and compressor B, with the rear section of carrier D, provided with the plunger C, follower $d^3$, and coupling-hooks P, with the side plungers, M and E, and their attachments, and runners O.

18. The combination of hopper A, front section of carrier D, provided with adjustable feed-bar T and compressor B, nipple or trip $b^3$, rear section of carrier D, provided with plunger C and its attachments, follower $d^3$, and coupling-hooks P, runners O, and side plungers, M and E, and their attachments.

19. The combination of the hopper A, front section of carrier D, provided with adjustable feed-bar T and compressor B, nipple or trip $b^3$, rear section of carrier D, provided with plunger C and its attachments, and coupling-hooks P, and follower $d^3$, with runners O, knob N, and side plungers, M and E, and their attachments.

20. The combination of the hopper A, front section of carrier D, provided with the adjustable feed-bar T and compressor B, adjustable nipple or trip $b^3$, plate W, plate or cut-off V, rear section of carrier D, provided with plunger C and its attachments, follower $d^3$, coupling-hooks P, runners O, and side plungers, M and E, and their attachments.

21. The combination of the front section of carrier D, provided with the adjustable feed-bar T, with the rear section of carrier D, provided with follower $d^3$ and coupling-hooks P, and runners O.

22. The combination of hopper A, front section of carrier D, provided with the adjustable feed-bar T and compressor B, adjustable nipple or trip $b^3$, plate W, plate or cut-off V, rear section of carrier D, provided with follower $d^3$, coupling-hooks P, runners O, and side plungers, M and E, and their attachments.

23. The combination of hopper A, and front section of carrier D, provided with adjustable feed-bar T, with rear section of carrier D, provided with follower $d^3$, coupling-hooks P, and runners O.

24. In combination with a hopper, an adjustable chamber for containing the amount of seed requisite for planting at one place, and mechanism for agitating the seed in the hopper and forcing the same into said chamber.

In witness whereof I have hereunto set my hand this 14th day of October, 1880.

JEREMIAH PALMER.

In presence of—
LOUIS W. FROST,
CHARLES G. COE.